(12) United States Patent
Okouchi et al.

(10) Patent No.: US 9,333,669 B2
(45) Date of Patent: May 10, 2016

(54) CUTTING DEVICES

(71) Applicant: MAKITA CORPORATION, Anjo-shi, Aichi (JP)

(72) Inventors: Katsumi Okouchi, Anjo (JP); Yohei Ogino, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 131 days.

(21) Appl. No.: 14/173,578

(22) Filed: Feb. 5, 2014

(65) Prior Publication Data

US 2014/0234046 A1 Aug. 21, 2014

(30) Foreign Application Priority Data

Feb. 15, 2013 (JP) .................................. 2013-027450
Sep. 12, 2013 (JP) .................................. 2013-189177

(51) Int. Cl.
 B27C 5/10 (2006.01)
 B23Q 11/00 (2006.01)
 B25F 5/02 (2006.01)
 B23C 1/20 (2006.01)

(52) U.S. Cl.
 CPC .............. *B27C 5/10* (2013.01); *B23Q 11/0042* (2013.01); *B23Q 11/0071* (2013.01); *B25F 5/02* (2013.01); *B23C 1/20* (2013.01); *Y10T 16/466* (2015.01); *Y10T 409/304088* (2015.01); *Y10T 409/306552* (2015.01); *Y10T 409/306608* (2015.01)

(58) Field of Classification Search
 CPC .. B27C 5/10; B23C 1/20; Y10T 409/306608; Y10T 409/306552; Y10T 409/304088
 USPC .......................................... 144/154.5, 136.95
 See application file for complete search history.

(56) References Cited

U.S. PATENT DOCUMENTS

| | | | | |
|---|---|---|---|---|
| 2,988,119 | A * | 6/1961 | Damijonaitis et al. ... | 144/136.95 |
| 3,022,806 | A * | 2/1962 | Johnston ..................... | 144/252.1 |
| 4,051,880 | A * | 10/1977 | Hestily ....................... | 144/252.1 |
| 5,584,620 | A * | 12/1996 | Blickhan et al. ............... | 409/137 |
| 6,024,144 | A * | 2/2000 | Qian ........................... | 144/252.1 |
| 6,443,675 | B1 * | 9/2002 | Kopras et al. .................. | 409/182 |
| D536,232 | S * | 2/2007 | Freese et al. ................... | D8/107 |
| 7,451,791 | B2 * | 11/2008 | Cooper et al. ........... | 144/136.95 |
| 2003/0223836 | A1 * | 12/2003 | Pozgay et al. ................ | 409/182 |
| 2011/0073335 | A1 | 3/2011 | Kato et al. | |
| 2011/0229283 | A1 | 9/2011 | Kato et al. | |
| 2012/0045290 | A1 | 2/2012 | Shibata et al. | |
| 2012/0241049 | A1 * | 9/2012 | Kato et al. ............... | 144/136.95 |

* cited by examiner

*Primary Examiner* — Daniel Howell
*Assistant Examiner* — Yasir Diab

(57) ABSTRACT

A cutting device may include a cutting unit having a cutter for trimming an edge portion of a workpiece or forming a groove in a workpiece. The cutting device may further include a base assembly configured to support the cutting unit with respect to the workpiece, and a grip device capable of being mounted to and removed from the cutting unit independently of the base assembly and configured to be capable of being grasped by a user during a cutting operation.

10 Claims, 10 Drawing Sheets

CUTTING DEVICES

This application claims priority to Japanese patent application serial numbers 2013-027450 and 2013-189177, the contents of which are incorporated herein by reference.

BACKGROUND OF THE INVENTION

Field of the Invention

Embodiments of the present invention relate to power tools, in particular to hand-held cutting devices called "laminate trimmers" and "routers" that may be used for a cutting operation, such as an edge trimming operation or a grooving operation. Such operations may be performed on any workpieces. Typical operations are performed on wooden workpieces.

This kind of cutting device may generally include a cutting unit having an electric motor as a drive source disposed therein, and a base assembly for supporting the cutting unit. The cutting unit may have a substantially cylindrical shape and may include an output shaft arranged on its lower side. The output shaft may be rotatably driven by the electric motor. An end tool or a cutter may be attached to the output shaft, so that the cutter rotates about the axis of the output shaft. The rotating cutter may be pressed against an edge or other part of a workpiece, during a cutting operation.

The base assembly may include a base portion and a cutting unit support portion. The base portion may contact an upper surface of the workpiece. The cutting unit support portion may support the cutting unit. As the base assembly, there has been proposed a fixed-type base assembly in which the cutting unit support portion is fixedly attached to the base portion, and a plunge-type base assembly (called a plunge base) in which the cutting unit support portion is vertically movably supported by the base portion.

The fixed-type base assembly is configured to be able to adjust the vertical position of the cutting unit relative to the cutting unit support portion or the base portion, so that a cutting depth of the cutter into a workpiece can be adjusted. For the cutting operation, the vertical position of the cutting unit may be fixed relative to the cutting unit support portion or the base portion. The cutting device having the cutting unit and the fixed-type base assembly supporting the cutting unit may be moved along a portion of the workpiece to be cut, while the user may hold the cutting device, for example, with one hand.

The cutting unit support portion of the plunge-type base assembly may have a pair of right and left grips that can be grasped by both hands of the user. The user may adjust and hold the vertical position of the cutting unit (i.e., the cutting depth of the cutter into the workpiece) while he or she grasps the grips with both hands. Then, the user may move the cutting device along a portion of the workpiece to be cut, so that a cutting operation can be performed.

US2011/02292838 (also published as JP-A-2011-213096) discloses a fixed-type base assembly having no grip. US2012/0045290 (also published as JP-A-2012-040771) discloses a fixed-type base assembly having a grip. US2011/0073335 (also published as JP-A-2011-073159) discloses a technique of enabling a cutting unit to be selectively mounted to a fixed-type base assembly having no grip or a plunge-type base assembly having grips.

In general, a cutting device having a fixed-type base assembly with no grip to be grasped by the use as disclosed in US2011/0073335 may be intended to be used mainly for a light-duty cutting operation that is performed while the user holds the cutting device with one hand. On the other hand, a cutting device having a fixed-type base assembly with right and left grips or a plunge-type base assembly with right and left grips may be intended to be used mainly during a heavy-duty cutting operation that is performed while the user holds the cutting device with both hands.

If a light duty cutting operation (requiring the user to simply hold the cutting device with one hand) and a heavy duty cutting operation (requiring the user to firmly hold the cutting device with both hands) are both necessary in the same workplace, both a fixed-type base assembly with no grip and a fixed-type base assembly with right and left grips (or a plunge-type base assembly with right and left grips) are required. In such a case, without preparation of the fixed-type base assembly with right and left grips or the plunge-type base assembly with right and left grips, it is difficult to perform a heavy-duty cutting operation. As a result, the cutting operations cannot be rapidly performed.

Therefore, there has been a need in the art for a cutting device that has a fixed-type base assembly with no grip but can be firmly held with both hands of the user if necessary for a cutting operation.

SUMMARY OF THE INVENTION

In one aspect according to the present teachings, a cutting device may include a cutting unit having a cutter for trimming an edge portion of a workpiece or forming a groove in a workpiece. The cutting device may further include a base assembly configured to support the cutting unit with respect to the workpiece, and a grip device capable of being mounted to and removed from the cutting unit independently of the base assembly. The grip device is configured to be capable of being grasped by a user during a cutting operation.

With this arrangement, the grip device may be a separate device from the cutting unit and the base assembly and may be mounted to the cutting unit if necessary or desired. Therefore, the cutting device can be used in two different modes including a first mode without the grip device and a second mode having the grip device. If the cutting device is used in the first mode without the grip device, the user can hold the cutting device with one hand. If the cutting device is used in the second mode with the grip device, the user can hold the cutting device with both hands.

The cutting device may be configured such that a mount position of the cutting unit with respect to the base assembly can be adjusted. Further, a mount position of the grip device with respect to the cutting unit may be adjusted independently of the base assembly.

With this arrangement, the cutting unit, the base assembly and the grip device can be mounted to each other while their positions are adjusted relative to each other. Therefore, the mount position of the grip device with respect to the cutting unit can be adjusted independently of the mount position of the cutting unit with respect to the base assembly. In this way, it is possible to optimally set the mount position of the grip device in both of the two different modes of the cutting device.

The cutting device may be configured such that the cutting unit can be mounted to the base assembly at a mount position in a vertical direction, independently of the grip device. With this arrangement, even in the situation where the cutting depth of the cutter into the workpiece is increased, the mount position (the height measured from the workpiece) of the grip device may not be lowered. Therefore, the operability of the cutting device can be ensured.

The cutting device may further include a pivotable lever operable for mounting the grip device to the cutting unit and for removing the grip device from the cutting unit. With this arrangement, the grip device can be mounted to and removed from the cutting unit by a one-touch operation of the lever (tool-less operation). Therefore, the operability of the cutting device can be improved.

The grip device may include a pair of right and left arms and a pair of right and left grip portions. The pair of right and left arms may extend downward from the mount position of the grip device to the cutting unit. The pair of right and left grip portions may be configured to be capable of being grasped by the user and may be respectively disposed at lower ends of the pair of right and left arms. With this arrangement, the grip portions to be grasped with hands of the user can be positioned closer to the workpiece. Therefore, the user can hold and move the cutting device in a stable manner. In this way, it is possible to improve the operability of the cutting device.

In another aspect of the present teachings, a cutting device may include a cutting unit, a base assembly, a grip device and a dust-collecting device. The cutting unit may have a cutter for trimming an edge portion of a workpiece or forming a groove in a workpiece. The base assembly may be configured to support the cutting unit with respect to the workpiece. The grip device may be capable of being mounted to and removed from the cutting unit independently of the base assembly and may be configured to be capable of being grasped by a user during a cutting operation. The dust-collecting device may be coupled to the grip device for collecting dust generated during a cutting operation of the workpiece. The dust-collecting device may be configured to be capable of being mounted to and removed from the cutting unit together with the grip device.

With this arrangement, dust generated during a cutting operation of the workpiece can be efficiently collected by the dust-collection device. Therefore, the cutting operation can be efficiently performed. In addition, because the dust-collecting device can be mounted to and removed from the cutting unit together with the grip device, the dust-collecting device can be easily handled.

The grip device may include a pair of right and left arms and a pair of right and left grip portions. The pair of right and left arms may extend downward from the mount position of the grip device to the cutting unit. The pair of right and left grip portions may be configured to be capable of being grasped by the user and are respectively disposed at lower ends of the pair of right and left arms. The dust-collecting device may include a dust-collecting passage, a connection portion and a dust-collection nozzle. The dust-collecting passage may be defined in at least one of the right and left arms and extend vertically therethrough from a top to a bottom of the at least one of the right and left arms, so that the dust-collecting passage has an upper opening and a lower opening respectively disposed at the top and the bottom of the at least one of the right and left arms. The connection portion may communicate with the upper opening of the dust-collecting passage and may be disposed at the top of the at least one of the right and left arms. The connection portion may be configured to be connectible with a dust-collection hose. The dust-collection nozzle may be connected to the lower opening of the dust-collecting passage and may be oriented towards a portion of the workpiece being cut for collecting the dust.

With this arrangement, the dust-collection hose that may extend from a dust-collector may be connected to the top of the at least one of the right and left arms. Therefore, it may be possible to inhibit the dust-collecting hose from contacting hands of the user or the workpieces during the cutting operation. In this way, the cutting device may be improved in terms of its operability. Eventually, the cutting operation can be rapidly performed.

The cutting device may be configured such that the vertical position of the connection portion of the dust-collecting device with respect to the cutting unit is adjusted as a mount position of the grip device to the cutting unit with respect to the vertical direction is adjusted. With this arrangement, adjusting the vertical position of the grip device may lead to adjustment of the vertical position of the dust-collecting hose. By setting the vertical position of the connection portion as high as possible, the dust-collection hose can be positioned further from the workpiece. Therefore, the operability of the cutting device can be further improved.

The base assembly may include a cutting unit support portion configured to support the cutting unit. The cutting unit support portion may include an insertion hole formed therein and may be configured to allow insertion of the dust-collection nozzle and hold the dust-collection nozzle in position. In this way, the dust-collection is oriented towards a portion of the workpiece being cut. The cutting unit support portion may further include a window and a door capable of opening and closing the window. Closing the window by the door may prevent the dust generated inside of the cutting unit support portion (i.e., at a portion of the workpiece being cut) from scattering to the outside. In this way, it is possible to efficiently collect the dust via the dust-collection nozzle.

In a further aspect of the present teachings, a grip device may be provided for use with a cutting device having a cutting unit including cutter, and a base assembly configured to support the cutting unit with respect to a workpiece. The grip device may be configured to be grasped by a user during a cutting operation and to be capable of being mounted to the cutting unit.

Mounting the grip device to a cutting device having no grip device enables the cutting device to be capable of being used for a heavy-duty cutting operation. In such an operation, both hands of the user grasp the cutting device. This can be done rapidly without incurring much cost. Therefore, the usability of the cutting device can be improved.

The grip device may include a pair of right and left arms and a pair of right and left grip portions. The pair of right and left arms may extend downward from a mount position of the grip device to the cutting unit. The pair of right and left grip portions may be configured to be capable of being grasped by the user and may be respectively disposed at lower ends of the pair of right and left arms. The grip device may further include a dust-collecting device. The dust-collecting device may include a dust-collecting passage, a connection portion and a dust-collection nozzle. The dust-collecting passage may be defined in at least one of the right and left arms to extend vertically therethrough from a top to a bottom of the at least one of the right and left arms. In this way, the dust-collecting passage has an upper opening and a lower opening respectively disposed at the top and the bottom of the at least one of the right and left arms. The connection portion may communicate with the upper opening of the dust-collecting passage and may be disposed at the top of the at least one of the right and left arms. The connection portion may be configured to be connectible with a dust-collection hose. The dust-collection nozzle may be connected to the lower opening of the dust-collecting passage and may be oriented towards a portion of the workpiece being cut for collecting the dust.

Assembling the dust-collecting device with the grip device that may be mounted to the cutting device gives the cutting device a dust-collecting function. Therefore, it may be possible to enhance the additional value of the grip device.

DETAILED DESCRIPTION OF THE INVENTION

Each of the additional features and teachings disclosed above and below may be utilized separately or in conjunction with other features and teachings to provide improved cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Figure 1:
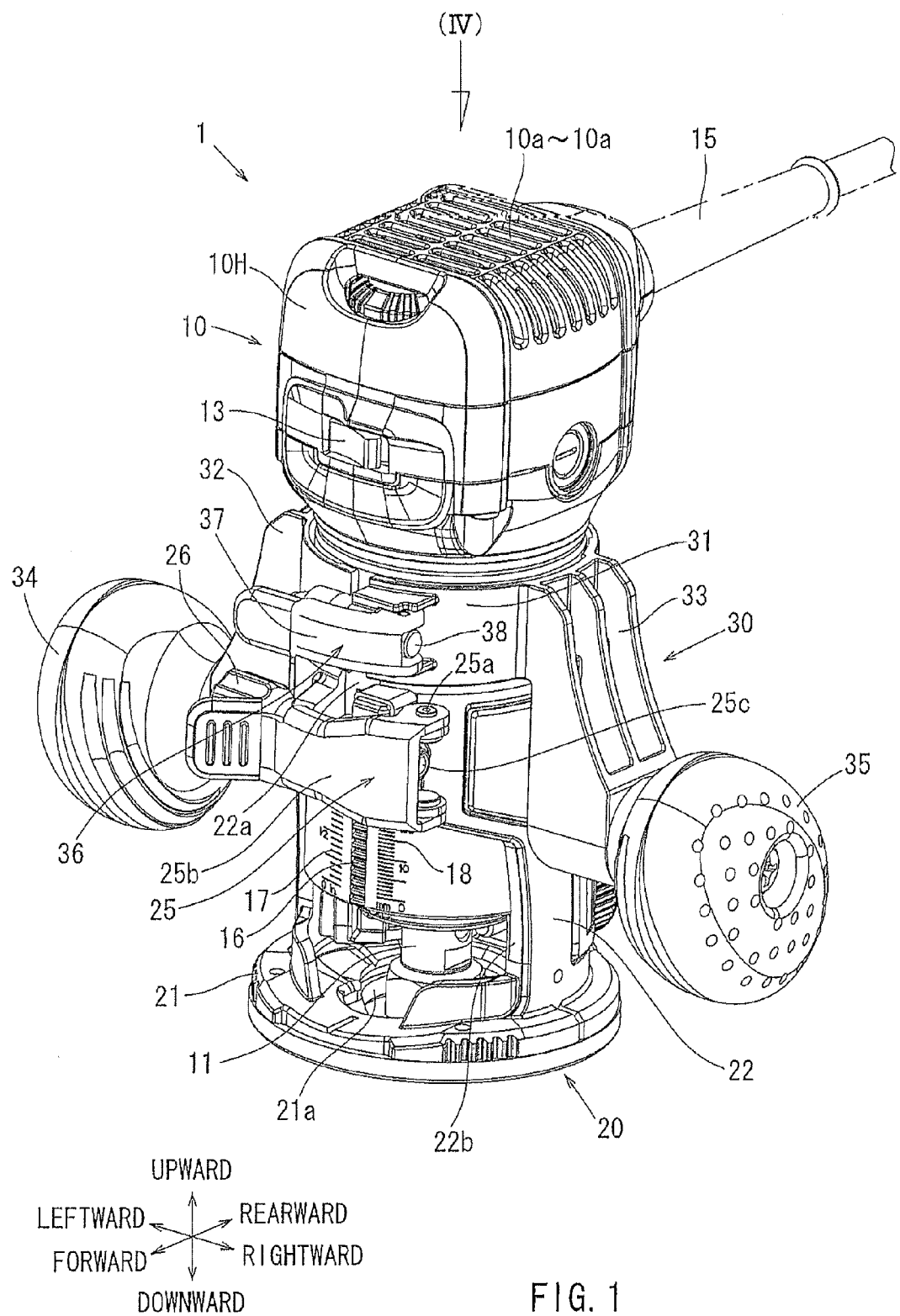
FIG. 1 is a perspective view of a cutting device according to a first embodiment.
Figure 2:
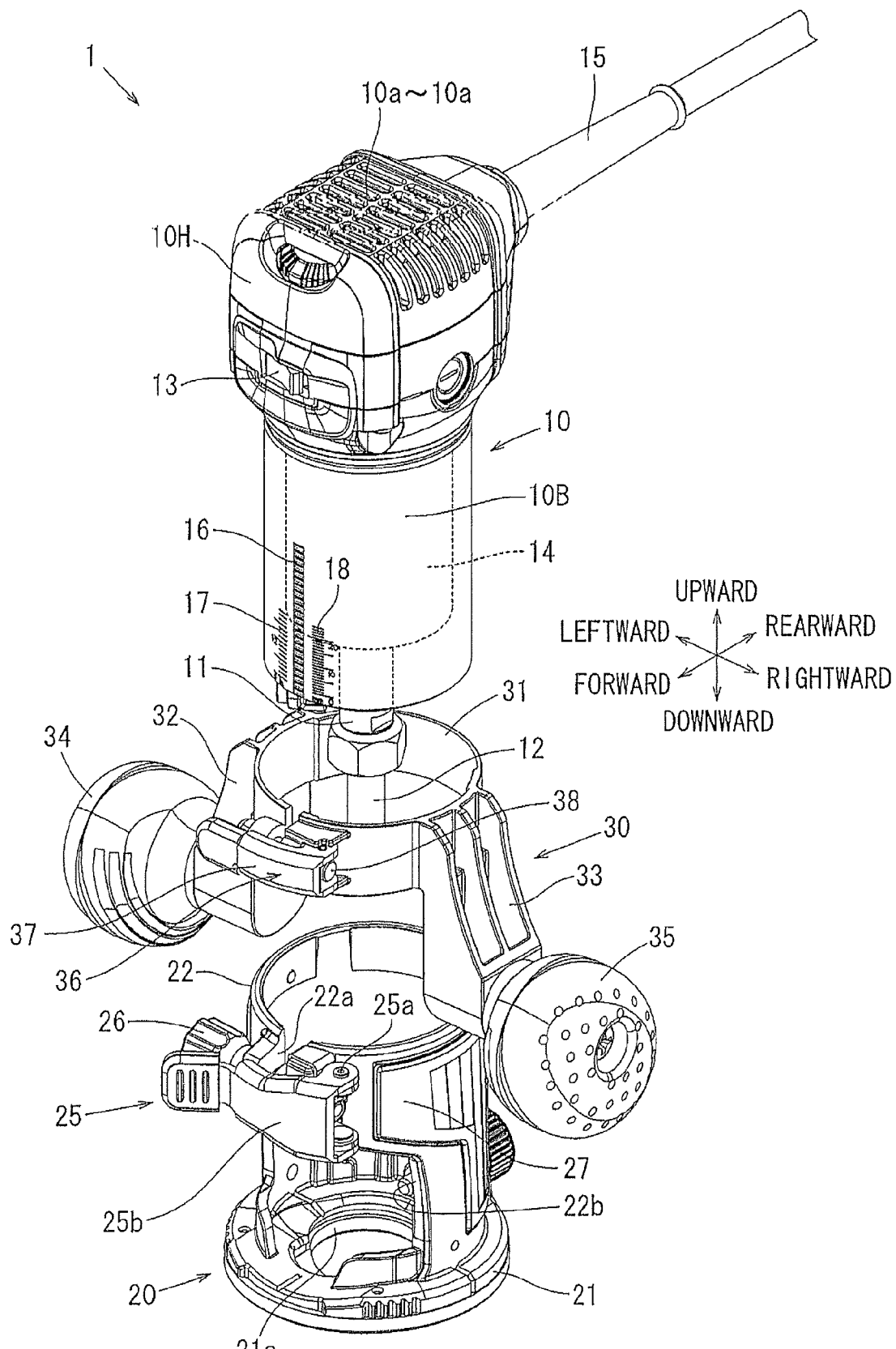
FIG. 2 is an exploded perspective view of cutting device.
Figure 3:
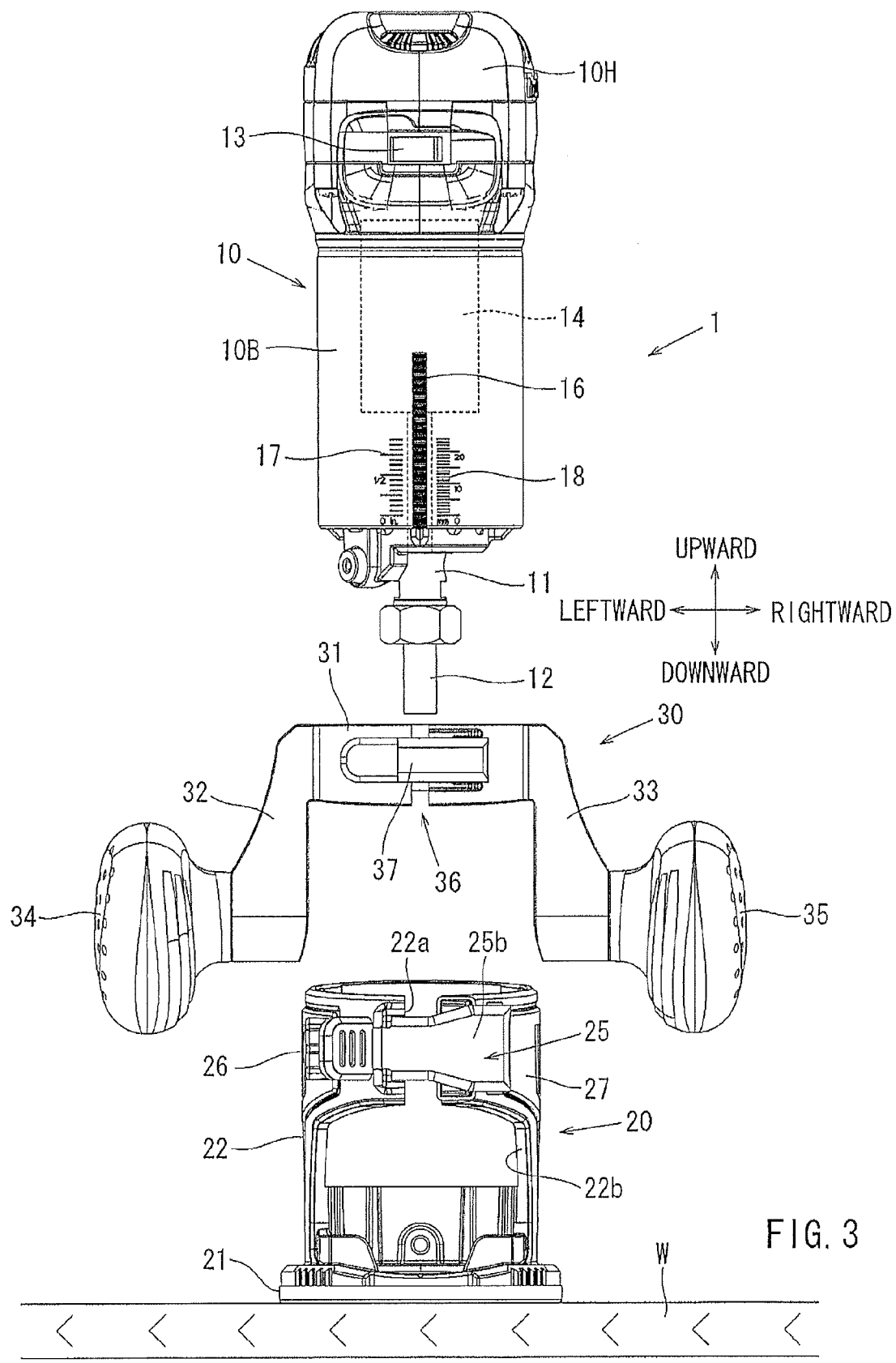
FIG. 3 is an exploded front view of the cutting device.
Figure 4:
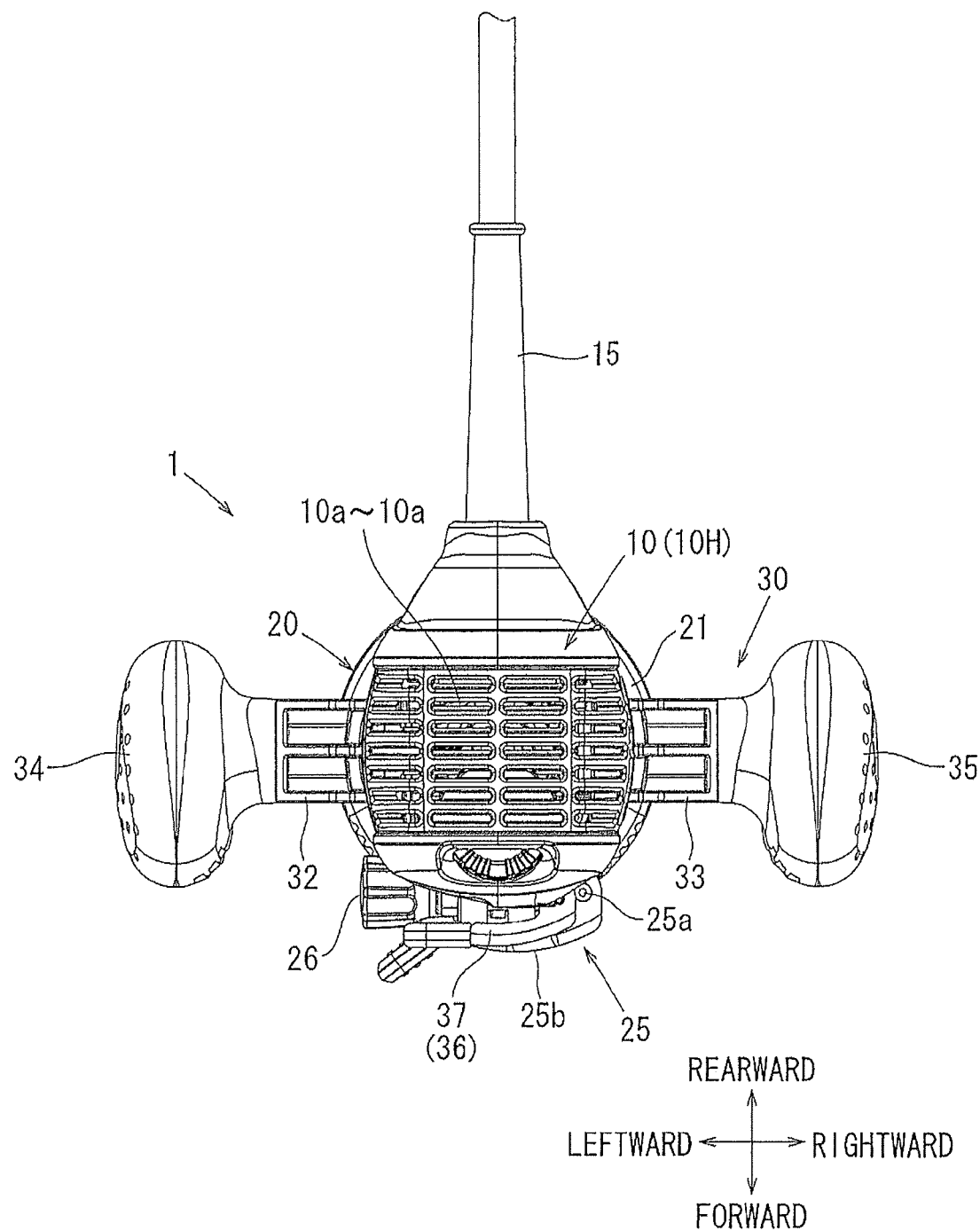
FIG. 4 is a plan view of the cutting device as viewed in a direction of arrow IV in FIG. 1.

A first embodiment will be described with reference to FIGS. 1 to 8. As shown in FIG. 1, a cutting device 1 according to a first embodiment may generally include a cutting unit 10, a base assembly 20, and a grip device 30. The cutting unit 10 may have an electric motor 14 disposed therein as a drive source. The base assembly 20 serves to hold the cutting unit 10 with respect to a workpiece W (see FIG. 3). The grip device 30 may be configured so as to be able to be grasped with both hands of the user. As shown in FIGS. 2 and 3, the cutting device 1 of this embodiment may be configured such that the cutting unit 10, the base assembly and the grip device 30 can be separated from each other.

The cutting unit 10 may have a body portion 10B and a head portion 10H positioned on the upper side of the body portion 10B. The body portion 10B may have a cylindrical shape, whereas the head portion 10H may have a block-like shape. The body portion 10B may have an output shaft 11 protruding downwardly therefrom. A cutter 12 serving as an end tool may be attached to the output shaft 11. A start switch 13 operable by the user may be provided on the front surface of the head portion 10H. Operating the start switch 13 from an OFF position to an ON position may start the electric motor 14 to rotate the output shaft 11 about its axis, so that the cutter 12 may rotate about the axis to perform a cutting operation of the workpiece W. A power source cord 15 for supplying an AC power to the electric motor 14 may be led out from the head portion 10H so as to extend from the rear surface of the head portion 10H. Air inlet holes 10a may be formed in the upper surface of the head portion 10H, so that outside air may be introduced into the head portion 10H via the air inlet holes 10a. Such air is used largely for cooling the electric motor 14.

As shown in FIG. 3, the base assembly 20 may include a disk-shaped base portion 21 and a tubular cutting unit support portion 22. The base portion 21 may be used for contacting the upper surface of the workpiece W. In this embodiment, the base assembly 20 is configured as a fixed-type base assembly, so that the cutting unit support portion 22 is fixedly joined to the upper surface of the base portion 21. A hole 21a may be formed in the central portion of the base portion 21, so that the output shaft 11 and the cutter 12 of the cutting unit 10 can extend downward through the hole 21a. The body portion 10B of the cutting unit 10 may be inserted into the cutting unit support portion 22 so as to be held by the cutting unit support portion 22. In order to perform an edge trimming operation on the workpiece W, the cutter 12 may extend downward from the base portion 21 and be pressed against the workpiece W. In this state, the cutting device 1 may be moved along the end edge, so that end edge of the workpiece W can be trimmed or cut.

The front portion of the cutting unit support portion 22 may include a slit 22a and a window 22b positioned on the lower side of the slit 22a. In this way, the cutting unit support portion 22 may have a substantially C-shape in its horizontal cross-section, so that the cutting unit support portion 22 has an adequate resiliency in a diameter increasing direction. A first clamp device 25 may be disposed at a position proximal to the slit 22a. The first clamp device 25 may have a first clamp lever 25b that can pivot in left and right directions about a support shaft 25a. As the first clamp lever 25b pivots forwardly (downwardly as viewed in FIG. 4) to an unclamped position, an action of a cam portion (not shown) of a clamp rod 25c may be released, so that a clamping force applied to the cutting unit support portion 22 may be released. In this way, the cutting unit support portion 22 may resiliently recover its shape to increase its diameter (i.e., to increase the width of the slit 22a). Then, the body portion 10B of the cutting unit 10 becomes free to move upward or downward relative to the cutting unit support portion 22. It may be also possible to withdraw the body portion 10B upwardly from the cutting unit support portion 22 for removing the cutting unit 10 from the base assembly 20. As the clamp lever 25b pivots to a clamped position shown in FIGS. 1 to 4, due to the action of the cam portion of the clamp rod 25c, the cutting unit support portion 22 may be deformed to decrease its diameter (i.e. to decrease the width of the slit 22a) against the resilient force. In this way, the body portion 10B of the cutting unit 10 can be firmly clamped by the cutting unit support portion 22.

A cutting depth adjusting mechanism may be associated with the first clamp device 25. More specifically, an adjusting dial 26 may be attached to one end of the clamp rod 25c. An adjusting gear (not shown) may be mounted to the clamp rod 25c at a position opposing the slit 22a. As the adjusting dial 26 is operated to rotate, the adjusting gear may rotate together with the adjusting dial 26 via the clamp rod 25c. The adjusting gear may engage a rack 16 that is disposed at the body portion 10B of the cutting unit 10 so as to extend vertically along the lateral surface of the body portion 10B. Scales 17 and 18 may be marked on or attached to the lateral surface of the body portion 10B on opposite sides of the rack 16 for indicating the mount position of the cutting unit 10 to the base assembly 20, i.e., a protruding distance (cutting depth) of the cutter 12 from the lower surface of the base portion 21.

Rotating the adjusting dial 26 in the unclamped state of the first clamp device 25 can change the position of the body portion 10B of the cutting unit 10 upward or downward relative to the cutting unit support portion 22 through engagement of the adjusting gear with the rack 16. In this way, by changing the vertical position of the body portion 10B relative to the cutting unit support portion 22, it is possible to change the protruding distance (cutting dept) of the cutter 12 from the lower surface of the base portion 21. After adjustment of the vertical position of the cutting unit 10 relative to the cutting unit support portion 22, the first clamp lever 25b may be pivoted to the clamped position, so that the cutting unit 10 can be fixed at the adjusted vertical position.

The window 22b of the front portion of the cutting unit support portion 22b may serve as a view window through which the user can observe from the inner hole 21a a cut portion where the workpiece W is being cut by the cutter 12. For this purpose, the window 22b may have an open width with respect to the left and right direction, which is larger than the width of the slit 22a.

A substantially entire outer circumferential surface of the cutting unit support portion 22 may be covered with a slip-preventing layer 27 that may be made of elastomeric resin. As explained previously, the base assembly 20 of this embodiment is configured as a fixed-type base assembly. Therefore, the cutting unit support portion 22 may be fixedly joined to the base portion 21 that serves to contact the upper surface of the workpiece W.

As described previously, the body portion 10B of the cutting unit 10 can be upwardly withdrawn from the cutting unit support portion 22 by pivoting the first clamp lever 25b forwardly for allowing the cutting unit support portion 22 to resiliently increase its diameter.

In this embodiment, the grip device 30 may be removed from the cutting unit 10 after removal of the cutting unit 10 from the base assembly 20. As shown in FIGS. 5 to 8, the grip device 30 may include a substantially ring-shaped mount portion 31, a pair of right and left arms 32 and 33 extending downward from the left and right side portions, respectively, of the mount portion 31, and a pair of right and left grip portions 34 and 35 respectively attached to the lower ends of the pair of right and left arms 32 and 33. Each of the grip portions 34 and 35 may have a compressed spherical shape.

The mount portion 31 may have a slit in its front portion, so that the mount portion 31 may have circumferential end portions 31a and 31b opposed to each other with respect the slit. A second clamp device 36 may be provided between the end portions 31a and 31b. Similar to the first clamp device 25 of the cutting unit support portion 22, the second clamp device 36 may include a second clamp lever 37 and a clamp rod 36. The second clamp lever 37 can pivot in left and right directions about a support shaft 38a. The clamp rod 36 may be inserted into the end portions 31a and 31b of the mount portion 31 so as to extend therebetween in the right and left directions. The support shaft 38a may be mounted to the right end portion of the clamp rod 38. A nut 39 may be threadably engaged with the left end portion of the clamp rod 38, so that the left end portion of the clamp rod 38 is prevented from moving in the axial direction relative to the left side end portion 31a.

Figure 5:
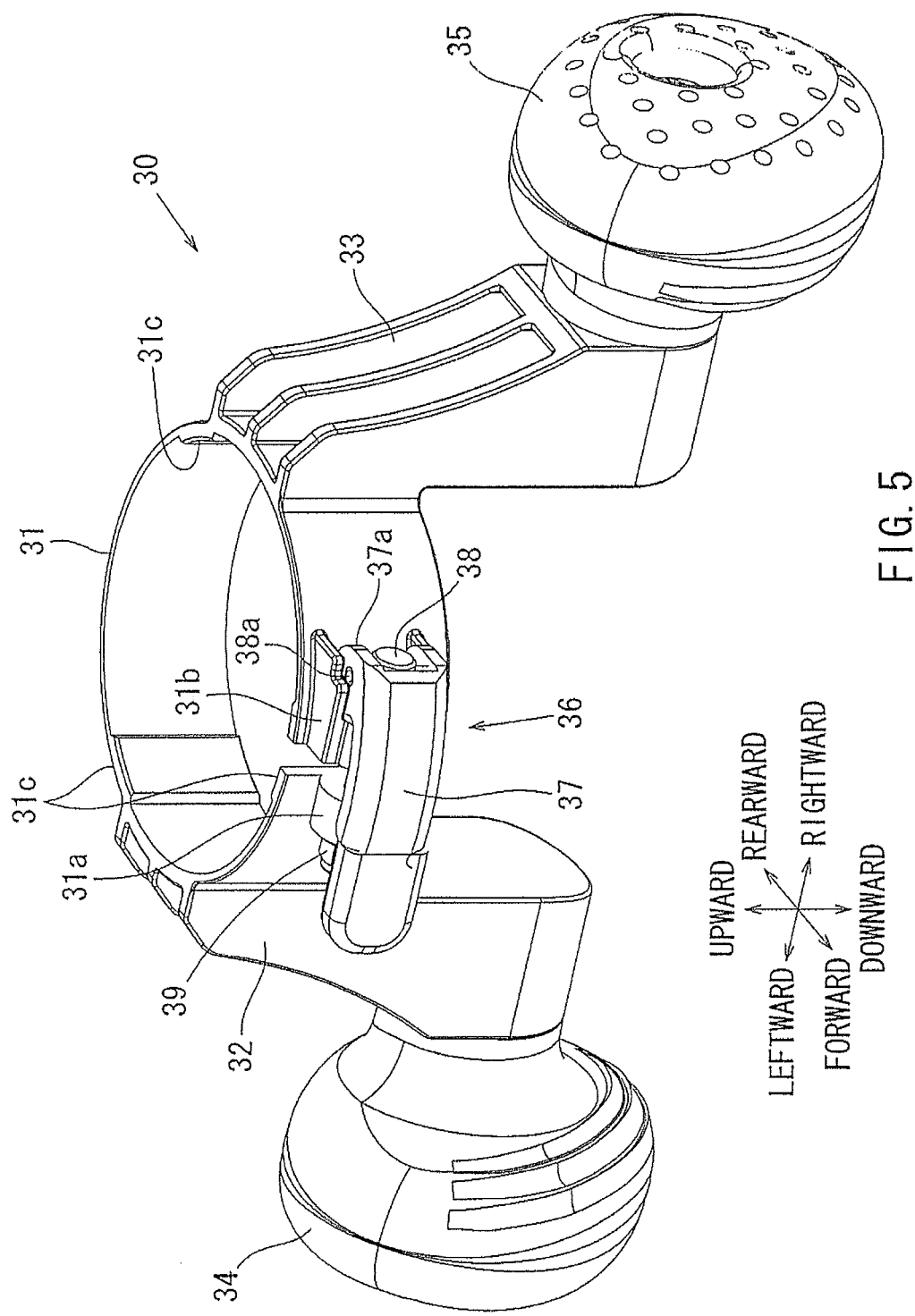
FIG. 5 is a perspective view of a grip device of the cutting device showing a clamped state of a second clamp device.
Figure 6:
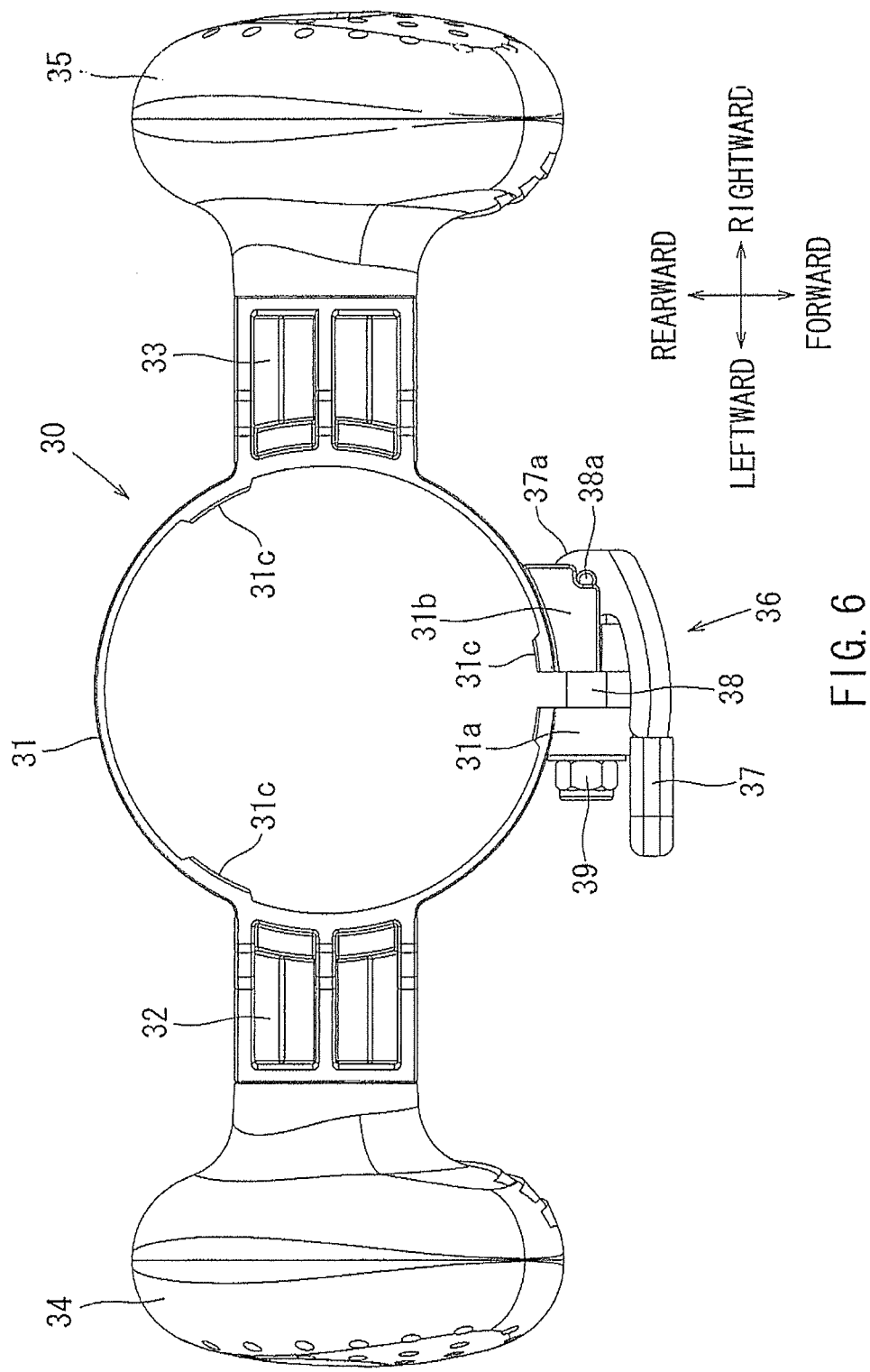
FIG. 6 is a plan view of the grip device showing the clamped state of the second clamp device.
Figure 7:
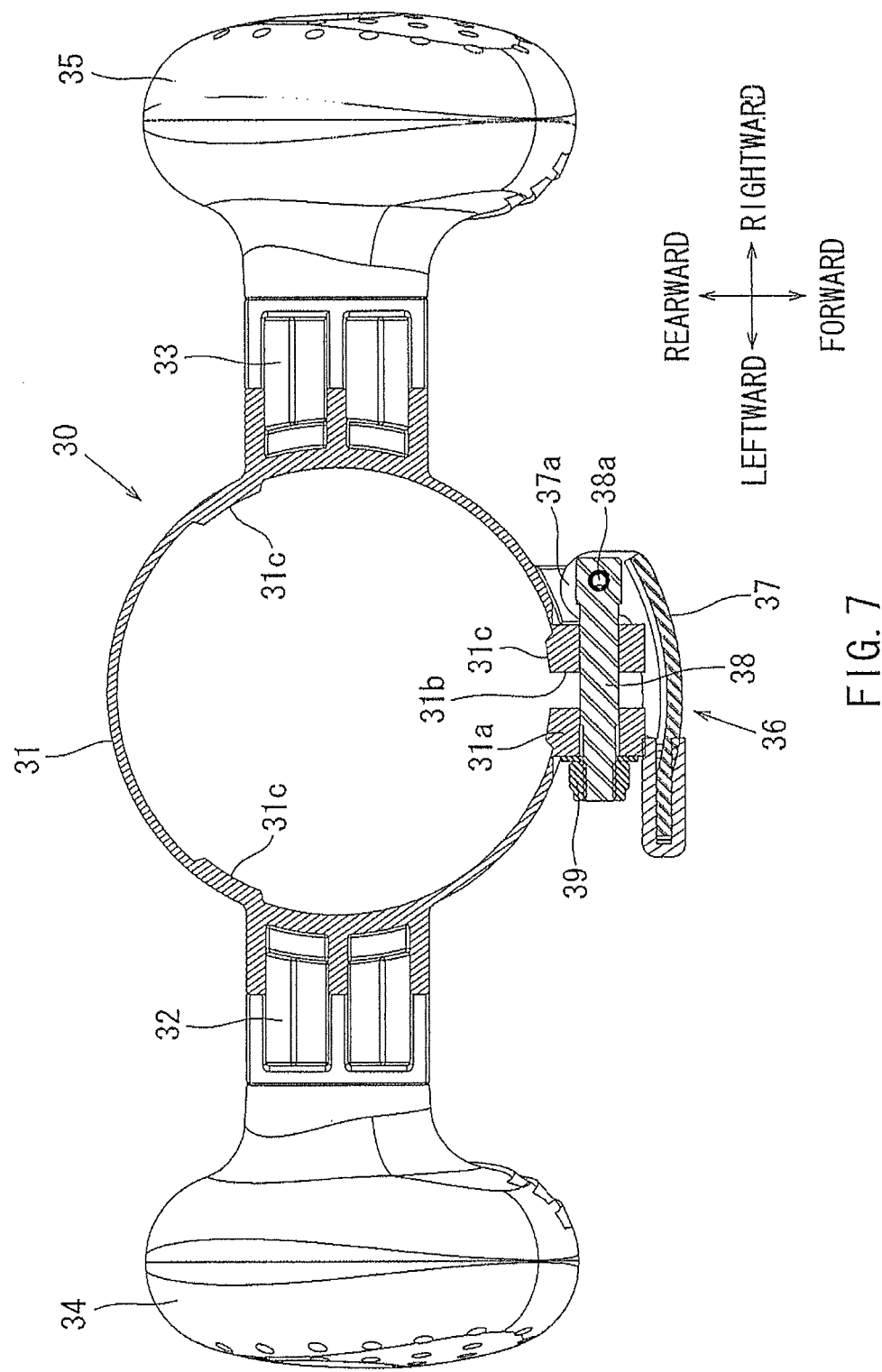
FIG. 7 is a plan view showing a cross-sectional part of the grip device in the clamped state of the second clamp device.

If the second clamp lever 37 is positioned at a clamped position shown in FIGS. 5 to 7, a cam portion 37a of the second clamp lever 37 may act on the clamp rod 38 to urge the clamp rod 36 rightward, so that the distance or the slit between the end portions 31a and 31b may be reduced to decrease the diameter of the mount portion 31. As the diameter of the mount portion 31 decreases in this way, the grip device 30 may be fixed in position relative to the body portion 10B of the cutting unit 10, which is inserted into the mount portion 31.

Figure 8:
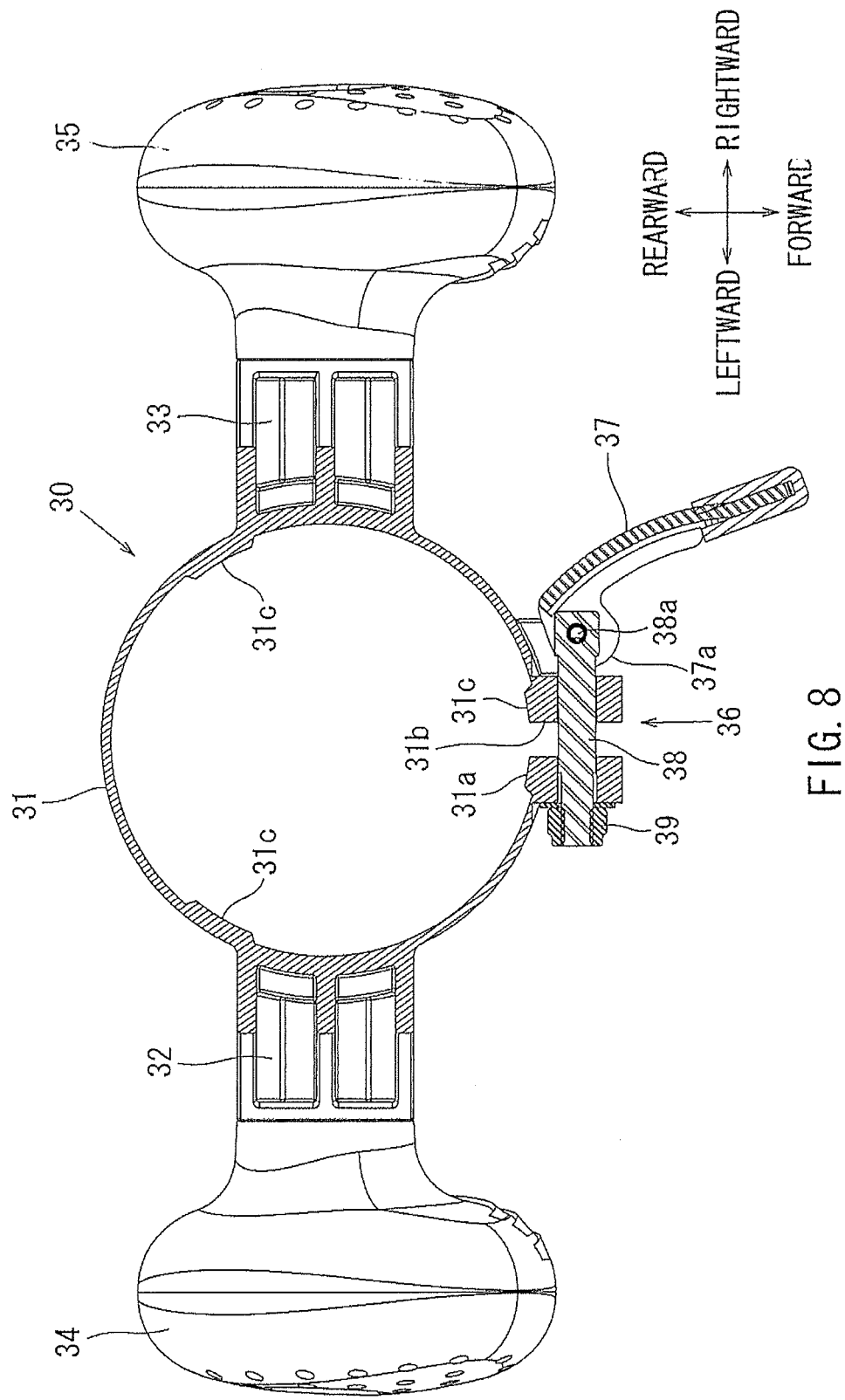
FIG. 8 is a plan view showing a cross-sectional part of the grip device in an unclamped state of the second clamp device.

As the second clamp lever 37 pivots rightward to be positioned at an unclamped position shown in FIG. 8, the cam portion 37a of the second clamp lever 37 may act on the clamp rod 38 to release the rightward urge force applied to the clamp rod 36, so that the mount portion 31 may resiliently recover to increase the distance or the slit between the end portions 31a and 31b. Therefore, the diameter of the mount portion 31 may be increased. As the diameter of the mount portion 31 increases in this way, the grip device 30 can be removed from the body portion 10B of the cutting unit 10 or its position relative to the body portion 10B can be changed in the vertical direction.

A suitable number of positioning projections 31c may be formed on the inner circumferential surface of the mount portion 31 so as to be spaced from each other in the circumferential direction (trisecting positions in this embodiment). The positioning projections 31c may serve to position the grip device 30 relative to the cutting unit 10 with respect to a direction about an axis.

As described previously, the pair of right and left arms 32 and 33 extend downward from the left and right side portions, respectively, of the mount portion 31. The arms 32 and 33 are fixed in position relative to the mount portion 31. The pair of right and left grip portions 34 and 35 each having a compressed spherical shape are respectively attached to the lower ends of the pair of right and left arms 32 and 33. Therefore, the user can firmly hold the cutting device 1 with both hands by grasping the grip portions 34 and 35.

Irrespective of whether or not the grip device 30 is mounted to the body portion 10B of the cutting unit 10, it is possible to mount the cutting unit 10 to the base assembly 20 by inserting the body portion 10B into the cutting unit support portion 22.

With the cutting device 1 configured as described above, the cutting unit 10, the base assembly 20 and the grip device 30 can be separated from each other. Irrespective of whether or not the grip device 30 is mounted to the cutting unit 10, it is possible to mount the cutting unit 10 to the base assembly 20. In the state where the grip device 30 is removed from the cutting unit 10, the user can perform a cutting operation (mainly a light-duty operation) by grasping the head portion 10H of the cutting unit 10 or by mainly grasping the cutting unit support portion 22 of the base assembly 20.

In the state where the grip device 30 is mounted to the cutting unit 10, the user can perform a cutting operation (e.g., a heavy-duty operation) by firmly grasping the grip portions 34 and 35 of the grip device 30 with both hands.

In this way, the cutting unit 10 and the base assembly 20 can be used as common components for two different modes of the cutting device 1 including a first mode with the grip device 30 and a second mode without the grip device 30. Each mode can be selectively chosen. In this way, it is possible to improve the versatility of the cutting device 1. In particular, it is possible to rapidly perform a series of cutting operations including a light-duty cutting operation and a heavy-duty cutting operation.

In addition, the second clamp device 36 can be operated to the clamped position and the unclamped position by a one-touch operation (i.e., the pivoting operation) of the second clamp lever 37. In this way, the grip device 30 can be attached and removed without the need of preparing a separate hand tool, such as a screwdriver and a spanner. Therefore, the usability and the convenience in use of the cutting device 1 can be further improved.

Further, in order to change the mode of the cutting device 1, it is only necessary to mount or remove the grip device 30. It is not necessary to change the cutting unit 10 or the base assembly 20 configured as a fixed-type base assembly. Therefore, an owner of a fix-base type cutting device including a no grip device can convert his or her cutting device into that having a grip device by purchasing only a grip device similar to the grip device 30. In this way, the owner can use the cutting device having a grip device without incurring much cost.

Further, the mount position of the grip device 30 on the body portion 10B of the cutting unit 10 can be adjusted in the vertical direction. Therefore, irrespective of the mount position of the cutting unit 10 on the base assembly 20, it is possible to position the grip device 30 as low as possible, so that the cutting device 1 can be always held at a stable position to enable the cutting device 1 to be easily moved for the cutting operation.

Further, the pair of right and left grip portions 34 and 35 are respectively attached to the lower ends of the pair of right and left arms 32 and 33 that extend downward from the mount portion 31. Therefore, irrespective of the adjusted cutting depth (i.e., the height of the cutting unit 10), it is possible to position the grip portions 34 and 35 at a lower level which may be substantially the same as the level of the cutting unit support portion 22 of the base assembly 20. In this way, the cutting device 1 can be further easily moved for the cutting operation.

The above embodiment can be modified in various ways. For example, although the pair of right and left arms 32 and 33 of the grip device 30 extend downward from the mount portion 31, the arms 32 and 33 may extend horizontally from the mount portion 31.

Further, although the mount position of the grip device 30 on the body portion 10B of the cutting unit 10 can be adjusted with respect to the vertical direction, it may be possible that the grip device 30 is mounted to the body portion 10B at a fixed position with respect to the vertical direction.

Furthermore, although the base assembly 20 is configured as a fixed-type base assembly in which the cutting unit support portion 22 is fixedly joined to the base portion 21, the grip device 30 of this embodiment may be applied to other embodiments. For example, it may be used in a tiltable-type base assembly in which a cutting unit support portion is supported by a base portion so as to be tiltable in forward and rearward directions relative to the base portion.

Figure 9:
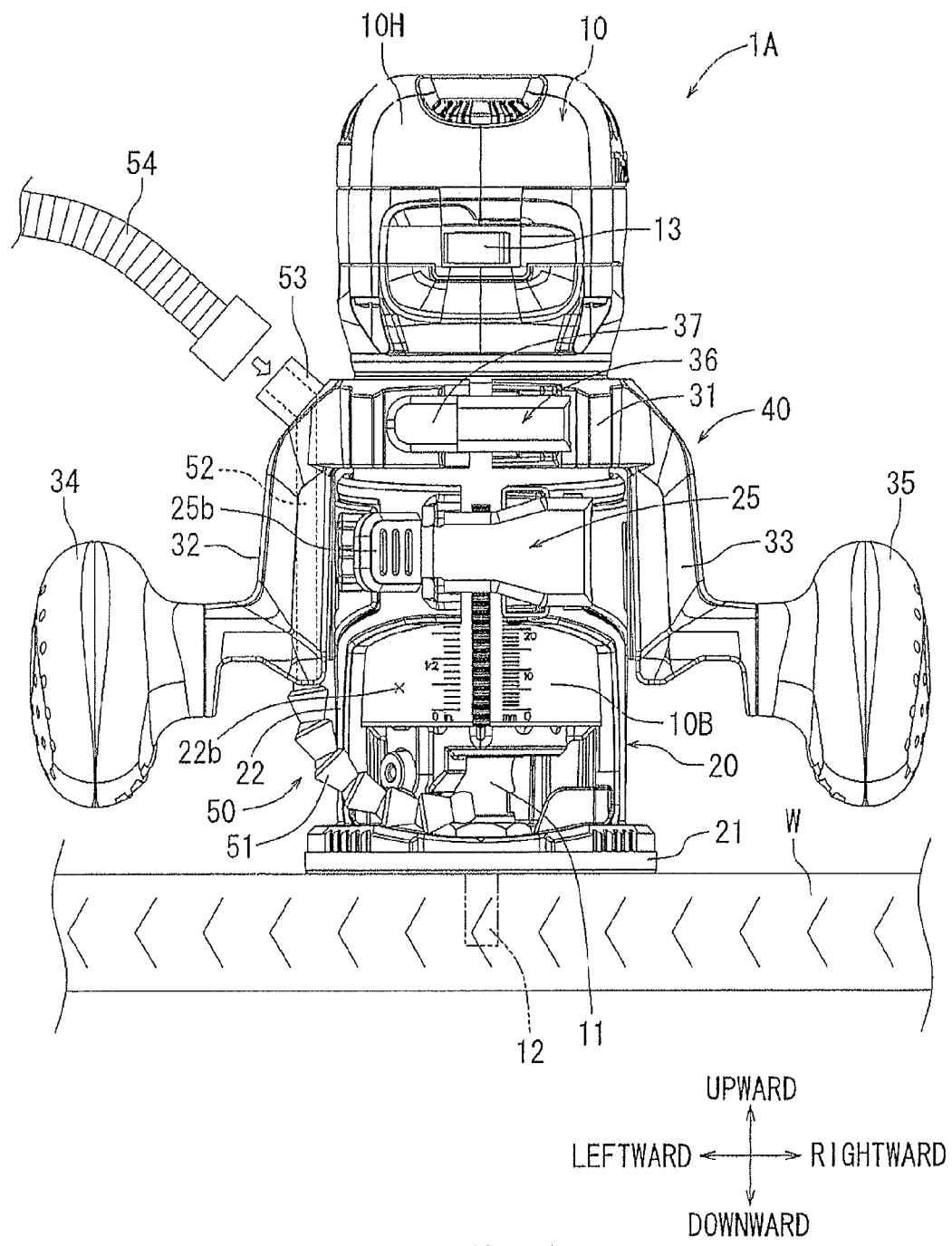
FIG. 9 is a front view of a cutting device according to a second embodiment.

A second embodiment will now be described with reference to FIG. 9. A cutting device 1A of the second embodiment is similar to the cutting device 1 of the first embodiment except that the cutting device 1A includes a grip device 40 that corresponds to the grip device 30 having a dust-collecting device 50 attached to the grip device 30. In other respects, the cutting device 1A is generally the same as the cutting device 1 of the first embodiment.

Conventionally, in order to collect cut powder or chips (hereinafter simply called "dust") that may scatter around the cutter 12 during the cutting operation, a shield cover having a connection portion for connection with a dust-collection hose may be fitted to the window 22b of the cutting unit support portion 22. In such a case, the dust-collection hose is necessary to be connected to the shield cover at a relatively low position (i.e., a position nearer to the workpiece W). As a result, it may be possible that the dust-collecting hose contacts the hand of the user or the workpiece to hinder the cutting operation and to eventually degrade the usability of the cutting device.

In the case of the cutting device 1A of the second embodiment, the dust-collecting device 50 is disposed at the grip device 40. Similar to the grip device 30 of the first embodiment, the grip device 40 may have the mount portion 31 generally having a ring-shape, a pair of right and left arms 32 and 33 extending downward from the left and right side portions, respectively, of the mount portion 31, and a pair of right and left grip portions 34 and 35 each having a compressed spherical shape which are attached to the lower ends of the pair of right and left arms 32 and 33, respectively. The grip device 40 also has the second clamp device 36, so that the grip device 40 can be easily mounted to and removed from the cutting unit 10 by the operation of the second clamp device 36. The cutting device 1A also includes the cutting unit 10 and the base assembly 30 that are the same as those of the first embodiment. Therefore, in FIG. 9, like members are given the same reference numerals as those of the first embodiment.

The dust-collecting device 50 may be disposed at the left arm 32 of the grip device 40 and may include a dust-collecting nozzle 51, a dust-collecting passage 52 and a connection portion 53. The dust-collecting passage 52 may be formed in the left arm 32 to extend vertically through the left arm 32, so that the dust-collecting passage 52 may have upper and lower openings respectively opened at the top and the bottom of the left arm 32. The connection portion 53 may be formed on the top of the left arm 32 so as to communicate with the upper opening of the dust-collecting passage 52. The dust-collecting nozzle 51 may be detachably connected to the lower opening of the dust-collecting passage 52. A dust-collecting hose 54 of a power driven dust-collector (not shown) may be detachably connected to the connection portion 53.

The dust-collecting nozzle 51 may be a flexible nozzle that allows for a change in the path of its arrangement or orientation. In this embodiment, the dust-collecting nozzle 51 extends forwardly from the bottom of the left arm 32 and its leading end extends through the window 22b of the cutting unit support portion 22 so as to be oriented toward a portion of the workpiece W that is being cut by the cutter 12. Therefore, when the dust-collector starts to operate, dust (cut powder or chips) scattering around the cut portion of the workpiece W may be drawn into the dust-collection nozzle 51 from its leading end. The dust drawn into the dust-collection nozzle 51 may be transferred to the dust-collector via the dust-collection passage 52, so that the dust may be accumulated in the dust-collector.

In addition to the advantages of the grip device 30 of the first embodiment described above, it is possible to efficiently collect the dust generated during the cutting operation of the workpiece W using an embodiment of cutting device 1A. Therefore, the cutting operation can be efficiently performed. In addition, because the dust-collecting device 50 is disposed at the grip device 40, the dust-collecting device 50 can be removed together with the grip device 40 when the grip device 40 is removed from the cutting unit 10.

In addition, because the dust-collection hose 54 can be connected to the arm 32 that is partially positioned at a relatively higher position of the cutting device 1A, it may be possible to inhibit the dust-collecting hose 54 from contacting the hand of the user or the workpieces W during the cutting operation. In this way, the cutting device 1A may be improved in its operability. Eventually, the cutting operation can be rapidly performed.

Further, by adjusting the vertical position of the grip device 40 relative to the cutting unit 10, it is possible to simultaneously adjust the vertical position of the connection portion 53 of the dust-collecting device 50.

Furthermore, by removing the dust-collection nozzle 51 and the dust-collection hose 54 from the arm 32 of the grip device 40, it is possible to use the cutting device 1A substantially in a state where the dust-collecting device 50 has been removed from the grip device 40.

Figure 10:
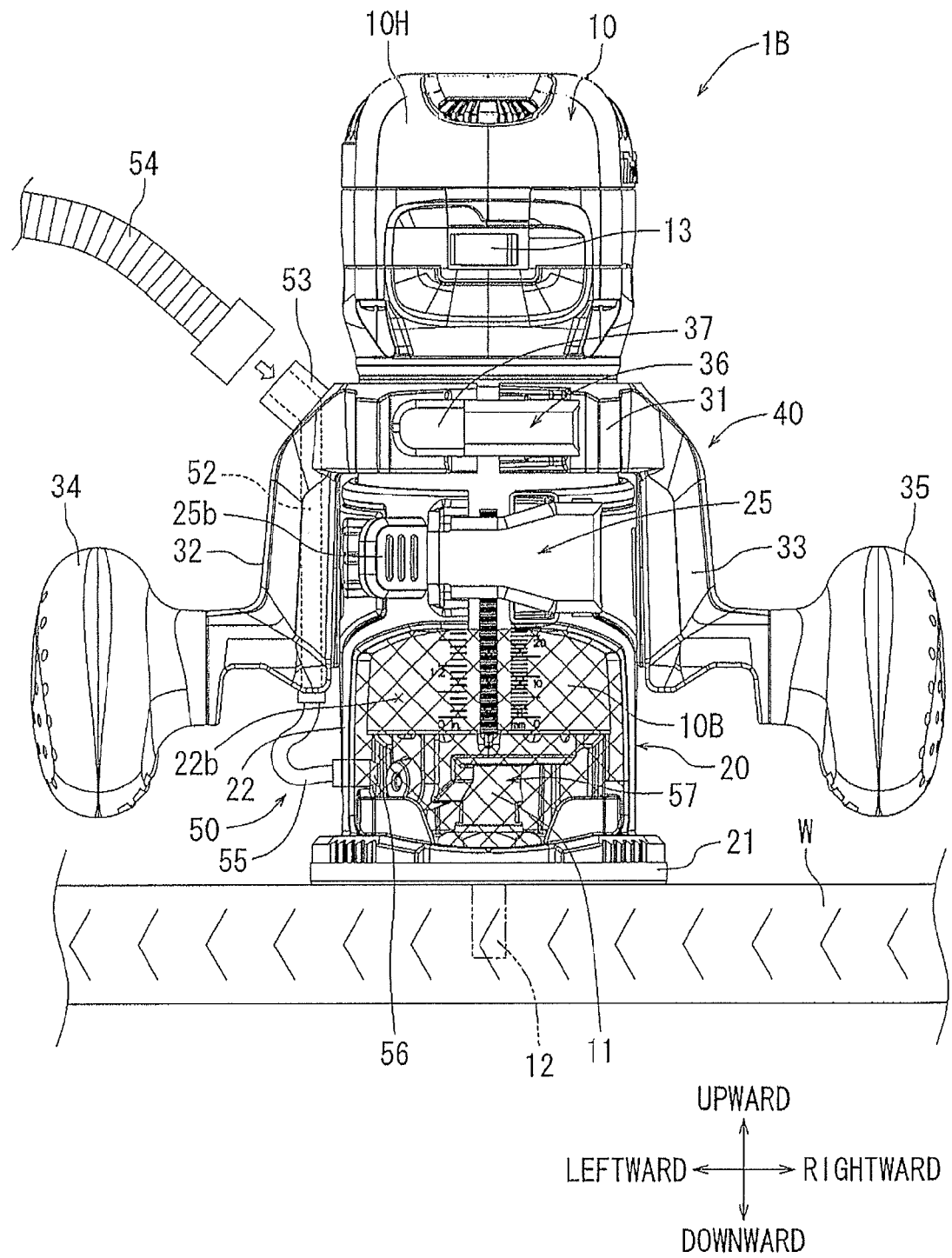
FIG. 10 is a front view of a cutting device according to a third embodiment.

The above second embodiment may be further modified. As described above, in the second embodiment, the leading end of the dust-collecting nozzle 51 extends through the window 22b of the cutting unit support portion 22 so as to be oriented toward a portion of the workpiece W that is being cut by the cutter 12. In the case of a dust-collecting device 50 of a cutting device 1B according to a third embodiment shown in FIG. 10, the leading end of a dust-collecting hose 55 (including a dust-collection nozzle 56) is inserted into an insertion hole formed in a lateral wall of the cutting unit support portion 22 so as to be held in position. In this connection, the window 22b of the cutting unit support portion 22 may be closed by a door 57 that can be opened and closed by the user. The door 57 may be formed of a transparent resin plate. The door 57 may have a substantially semicircular shape in a horizontal sectional view and may be arranged so as to be movable in the left and right directions along the inner circumferential surface of the cutting unit support portion 22 for opening and closing the window 22b. FIG. 10 shows the state where the window 22b is closed by the door 57. For the purpose of illustration, the door 57 is shown with a lattice pattern of diagonal lines.

Similar to the second embodiment, the dust-collecting device 50 has a dust-collecting passage 52 and a connection portion 53. In the case of the third embodiment, the dust-collection nozzle 56 may be connected to the lower opening of the dust-collection passage 52 via a dust-collection hose 55 that may have flexibility. The dust-collection nozzle 56 may be connected to the leading end of the dust-collection hose 53. The leading end of the dust-collection nozzle 56 may be inserted into the insertion hole formed in the lateral wall of the cutting unit support portion 22 so as to be held in position and oriented towards the inside of the cutting unit support portion 22 (i.e., toward a portion of the workpiece W being cut).

According to the cutting device 1B of the third embodiment, the dust-collecting device 50 has a door 57 that can serve to open and close the window 22b of the cutting unit support portion 22. Closing the window 22b by the door 57 may prevent the dust generated inside of the cutting unit support portion 22 (i.e., at a portion of the workpiece W being cut) from scattering to the outside. In this way, it is possible to efficiently collect the dust via the dust-collection nozzle 56.

What is claimed is:

1. A cutting device, comprising:
a cutting unit having a cutter for trimming an edge portion of a workpiece or forming a groove in a workpiece,
a base assembly configured to support the cutting unit with respect to the workpiece; and
a grip device capable of being mounted to and removed from the cutting unit independently of the base assembly and configured to be capable of being grasped by a user during a cutting operation,
wherein a mount position of the grip device to the cutting unit is adjustable in a vertical direction.

2. The cutting device according to claim 1, wherein:
the cutting unit can be mounted to the base assembly at a first mount position in the vertical direction; and
the mount position of the grip device to the cutting unit is adjustable in the vertical direction independently of the base assembly, the mount position of the grip device to the cutting unit being different from the first mount position.

3. The cutting device according to claim 1, wherein cutting unit can be mounted to the base assembly at a first mount position in the vertical direction, and the first mount position can be adjusted independently of the grip device.

4. The cutting device according to claim 1, further comprising a pivotable lever operable for mounting the grip device to the cutting unit and for removing the grip device from the cutting unit.

5. The cutting device according to claim 1, wherein the grip device includes a pair of right and left arms and a pair of right and left grip portions, the pair of right and left arms extend downward from the mount position of the grip device at which the grip device is mounted to the cutting unit, and the pair of right and left grip portions are configured to be capable of being grasped by the user and are respectively disposed at lower ends of the pair of right and left arms.

6. A cutting device, comprising:
a cutting unit having a cutter for trimming an edge portion of a workpiece or forming a groove in a workpiece,
a base assembly configured to support the cutting unit with respect to the workpiece; and
a grip device capable of being mounted to and removed from the cutting unit independently of the base assembly and configured to be capable of being grasped by a user during a cutting operation;
a dust-collecting device coupled to the grip device for collecting dust generated during a cutting operation of the workpiece;
wherein the dust-collecting device is configured to be capable of being mounted to and removed from the cutting unit together with the grip device in a state that the dust-collecting device is coupled to the grip device.

7. The cutting device according to claim 6, wherein:
the grip device includes a pair of right and left arms and a pair of right and left grip portions, the pair of right and left arms extend downward from the mount position of the grip device to the cutting unit, and the pair of right and left grip portions are configured to be capable of being grasped by the user and are respectively disposed at lower ends of the pair of right and left arms; and
the dust-collecting device comprises:
a dust-collecting passage defined in at least one of the right and left arms and extend vertically therethrough from a top to a bottom of the at least one of the right and left arms, so that the dust-collecting passage has an upper opening and a lower opening respectively disposed at the top and the bottom of the at least one of the right and left arms;
a connection portion communicating with the upper opening of the dust-collecting passage and disposed at the top of the at least one of the right and left arms, the connection portion being configured to be connectible with a dust-collection hose; and
a dust-collection nozzle connected to the lower opening of the dust-collection passage and oriented towards a portion of the workpiece being cut for collecting the dust.

8. The cutting device according to claim 7, wherein:
the cutting device is configured such that a vertical position of the connection portion of the dust-collecting device with respect to the cutting unit is adjusted as a mount position of the grip device to the cutting unit with respect to the vertical direction is adjusted.

9. The cutting device according to claim 7, wherein:
the base assembly includes a cutting unit support portion configured to support the cutting unit;
the cutting unit support portion includes an insertion hole formed therein, the insertion hole being configured to allow insertion of the dust-collection nozzle and hold the dust-collection nozzle in position, so that the dust-collection nozzle is oriented towards a portion of the workpiece being cut; and
the cutting unit support portion further includes a window and a door capable of opening and closing the window.

10. A grip device for use with a cutting device including a cutting unit having a cutter, and a base assembly configured to support the cutting unit with respect to a workpiece, wherein:
the grip device is configured to be grasped by a user during a cutting operation and to be capable of being mounted to the cutting unit,
a mount position of the grip device to the cutting unit is adjustable in a vertical direction,
the grip device includes a pair of right and left arms and a pair of right and left grip portions, the pair of right and left arms extend downward from the mount position of the grip device to the cutting unit, and the pair of right and left grip portions are configured to be capable of being grasped by the user and are respectively disposed at lower ends of the pair of right and left arms; and
the grip device further includes a dust-collecting device, the dust-collecting device comprising:
a dust-collecting passage defined in at least one of the right and left arms to extend vertically therethrough from a top to a bottom of the at least one of the right and left arms, so that the dust-collecting passage has an upper opening and a lower opening respectively disposed at the top and the bottom of the at least one of the right and left arms;
a connection portion communicating with the upper opening of the dust-collecting passage and disposed at the top of the at least one of the right and left arms, the connection portion being configured to be connectible with a dust-collection hose; and
a dust-collection nozzle connected to the lower opening of the dust-collecting passage and oriented towards a portion of the workpiece being cut for collecting the dust.

* * * * *